(12) United States Patent
Kim et al.

(10) Patent No.: US 8,964,248 B2
(45) Date of Patent: Feb. 24, 2015

(54) IMAGE FORMING APPARATUS AND METHOD FOR COLOR REGISTRATION ADJUSTMENT

(75) Inventors: Geon-hoon Kim, Seoul (KR); Beom-ro Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 213 days.

(21) Appl. No.: 13/286,573

(22) Filed: Nov. 1, 2011

(65) Prior Publication Data

US 2012/0287449 A1 Nov. 15, 2012

(30) Foreign Application Priority Data

May 13, 2011 (KR) ........................ 10-2011-0045277

(51) Int. Cl.
| | | |
|---|---|---|
| G06F 15/00 | (2006.01) | |
| H04N 1/50 | (2006.01) | |
| G03G 15/01 | (2006.01) | |
| G03G 15/00 | (2006.01) | |

(52) U.S. Cl.
CPC ........... *H04N 1/506* (2013.01); *G03G 15/0131* (2013.01); *G03G 15/0189* (2013.01); *G03G 15/5058* (2013.01); *G03G 2215/0161* (2013.01)
USPC .................. 358/1.9; 399/39; 399/49; 399/66; 399/301

(58) Field of Classification Search
CPC combination set(s) only.
See application file for complete search history.

(56) References Cited

U.S. PATENT DOCUMENTS

| | | |
|---|---|---|
| 5,550,625 A | 8/1996 | Takamatsu et al. |
| 2003/0184002 A1* | 10/2003 | Akiyama et al. ............. 271/110 |
| 2005/0047834 A1* | 3/2005 | Tomita et al. ................. 399/301 |
| 2005/0099439 A1 | 5/2005 | Folkins |
| 2005/0212887 A1 | 9/2005 | Tanaka et al. |
| 2006/0153603 A1* | 7/2006 | Nishikawa et al. ........... 399/301 |
| 2008/0131151 A1* | 6/2008 | Tamaoki ......................... 399/49 |
| 2008/0285988 A1* | 11/2008 | Uchida et al. .................. 399/43 |
| 2008/0292368 A1* | 11/2008 | Baretsky et al. ............. 399/301 |
| 2009/0238588 A1* | 9/2009 | Matsuda et al. ................ 399/46 |

OTHER PUBLICATIONS

European Search Report for 11190928.9, mailed Mar. 2, 2012.

\* cited by examiner

*Primary Examiner* — Houshang Safaipour
*Assistant Examiner* — Idowu O Osifade
(74) *Attorney, Agent, or Firm* — Staas & Halsey LLP

(57) ABSTRACT

A method for color registration includes determining if color registration is necessary, and if color registration is necessary, rotating an image forming medium and setting an optimum luminance of a registration sensor with respect to a rotating surface of the image forming medium, confirming an area with an undesirable surface condition on the image forming medium using luminance detected with respect to the rotating surface of the image forming medium during the setting of the optimum luminance, forming a preset mark for color registration adjustment excluding the area confirmed to have an undesirable surface condition, and carrying out color registration adjustment using the optimum luminance set with respect to the formed mark.

20 Claims, 8 Drawing Sheets

| Process | Algorithm of embodiment | Conventional algorithm |
|---|---|---|
| Sensor Calibration | 3.52sec | 3.22sec |
| Noise Check | 0 (performed within calibration) | 3.22sec |
| ACR Pattern Print | 15.76sec | 15.76sec |
| Total Time | 19.28sec | 22.2sec |

IMAGE FORMING APPARATUS AND METHOD FOR COLOR REGISTRATION ADJUSTMENT

CROSS-REFERENCE TO RELATED APPLICATIONS

This application claims the priority benefit of Korean Patent Application No. 10-2011-0045277, filed on May 13, 2011 in the Korean Intellectual Property Office, the disclosure of which is incorporated herein by reference in its entirety.

BACKGROUND

1. Field

The following description relates to an image forming apparatus and a method for color registration adjustment and, more particularly, to an image forming apparatus which detects an area with an undesirable surface condition of an image forming medium and a method for correction color registration.

2. Description of the Related Art

An electrophotographic printer, such as a color laser printer, for example, generally includes four photosensitive drums Dy, Dc, Dm, and Dk corresponding to four colors, yellow, cyan, magenta, and black, a light exposing device which irradiates light onto the respective photosensitive drums Dy, Dc, Dm, and Dk to form an electrostatic latent image of an intended image, a developing device which develops the electrostatic latent image with developers of respective colors, and an image forming medium. The image forming medium (or transfer belt or intermediate transfer belt) receives developer images formed on the respective photosensitive drums Dy, Dc, Dm, and Dk in sequence and in an overlapping manner, forms a complete color image, and transfers the color image onto a printing paper.

Accordingly, to print out one color image, an image is developed on the four photosensitive drums Dy, Dc, Dm, and Dk in respective colors, and the developer images are overlappingly printed at a same location on the transfer belt to thus form a final color image. The final color image is then printed on a printing paper.

Meanwhile, in order to form an intended color image in an intended form precisely at the same intended location on the transfer belt, it is very important that the developer images in four colors transferred from the photosensitive drums Dy, Dc, Dm, and Dk start on the transfer belt exactly at the same location and also end exactly at the same location. Even if the images on the four photosensitive drums Dy, Dc, Dm, and Dk are developed in crisp and clear form, if any developer images are transferred in even a slightly misaligned arrangement, it is not possible to obtain a final color image with clear color and form based on such developer images.

Accordingly, in order to form an intended color image in precisely-intended color and form, it is important to align the location at which the exposure device starts exposing light onto the respective photosensitive drums Dy, Dc, Dm, and Dk by considering the moving speed of the transfer belt, so that the plurality of developer images overlap each other at a precisely-aligned location. This alignment of light exposure location is 'color registration'.

The color registration is generally carried out using a registration sensor equipped in the image forming apparatus. The registration sensor irradiates light onto a registration pattern developed on the image forming medium, and measures error in the image alignment by detecting the reflected light.

In order to accurately measure the error in image alignment, the registration sensor irradiates light onto the image forming medium based on an accurate luminance value. To be specific, if the luminance of the registration sensor is higher than a preset value, part of the registration pattern developed on the transfer belt may not be perceived. If the luminance of the registration sensor is lower than the preset value, contaminants within the transfer belt may be perceived as part of the pattern.

It is also necessary that the registration pattern is formed on a non-contaminated area on the image forming medium to ensure that the error in image alignment is measured accurately.

In this respect, conventionally, the operation of finding luminance of the registration sensor is carried out first, which is then followed by the operation of rotating the image forming medium one time to find a contaminated area which may exist on the image forming medium.

However, since the operation to find the luminance of the registration sensor is also carried out by rotating the image forming medium one time, the image forming medium is rotated once each time to find the luminance of the registration sensor and also to find the contaminated area on the image forming medium, and it takes some time until the two operations are finally completed.

SUMMARY

Exemplary embodiments of the present invention overcome the above disadvantages and other disadvantages not described above. However, the present invention is not required to overcome the disadvantages described above, and an exemplary embodiment of the present invention may not overcome any of the problems described above.

The following description relates to an image forming apparatus which is capable of detecting an area with an undesirable surface condition on the image forming medium concurrently during an operation where luminance of a registration sensor is set, and a method of color registration adjustment.

In one embodiment, a method for color registration of an image forming apparatus having a registration sensor is provided, which may include determining if color registration is necessary, and if color registration is necessary, rotating an image forming medium and setting an optimum luminance of the registration sensor with respect to a rotating surface of the image forming medium, confirming an area with an undesirable surface condition on the image forming medium using luminance detected with respect to the rotating surface of the image forming medium, forming a preset mark for color registration adjustment excluding the area confirmed to have an undesirable surface condition, and carrying out color registration adjustment using the optimum luminance set with respect to the formed mark, where a time for setting an optimum luminance of the registration sensor may be overlapped with a time for detecting an area with an undesirable surface condition.

Confirming the area with an undesirable surface condition may include comparing luminance detected with respect to the rotating surface of the image forming medium with a preset luminance, and confirming an area of the image forming medium to have an undesirable surface condition if the detected luminance of the area has luminance below the preset luminance.

The area with an undesirable surface condition may include at least one of a contaminated area and a damaged area of the image forming medium.

The method may additionally include storing identification information of the area confirmed to have an undesirable surface condition.

Setting the optimum luminance may include providing a preset initial control signal to the registration sensor, detecting luminance reflected from the image forming medium according to the control signal provided to the registration sensor, calculating a control signal according to a difference between the detected luminance and a preset target luminance, comparing the detected luminance with the target luminance and determining if the luminance of the registration sensor has a stable value, providing the calculated control signal to the registration sensor if the luminance of the registration sensor does not have a stable value, and repeating the detecting, the calculating and the determining, and if the luminance of the registration sensor has a stable value, repeating rotating of the image forming medium and also the detecting and the calculating until the image forming medium is rotated one time, to thereby select optimum luminance of the registration sensor.

The target luminance may be luminance at a time point when the light reflected from the image forming medium is saturated.

Calculating the control signal may include calculating the control signal according to the luminance detected using at least one of Proportional-Integral (PI) and Proportional-Integral-Derivative (PID) controls, and a control signal according to the target luminance.

Setting the optimum luminance may additionally include storing the calculated control signal and the luminance detected according to the calculated control signal.

Setting the optimum luminance may additionally include calculating an average value of the detected luminance and a maximum value of the detected luminance, using the stored luminance. Selecting the optimum luminance may include selecting the optimum luminance of the registration sensor using the calculated average and maximum values.

The image forming medium may include at least one of a photosensitive drum, an intermediate transfer belt, and a paper conveying belt.

In one embodiment, an image forming apparatus may include a control unit which determines if color registration is necessary, a medium driving unit which rotates an image forming medium, a color registration unit which controls the medium driving unit to rotate the image forming medium if color registration is necessary, sets an optimum luminance of the registration sensor with respect to a rotating surface of the image forming medium, and confirms an area with an undesirable surface condition on the image forming medium using luminance detected with respect to the rotating surface of the image forming medium, and an image forming unit which forms a preset mark for color registration adjustment excluding the area confirmed to have an undesirable surface condition, wherein the color registration unit carries out color registration adjustment using the optimum luminance set with respect to the formed mark, and a time for setting an optimum luminance of the registration sensor may be overlapped with a time for detecting an area with an undesirable surface condition.

The color registration unit may compare luminance detected with respect to the rotating surface of the image forming medium with a preset luminance, and confirm an area of the image forming medium to have an undesirable surface condition if the detected luminance of the area has luminance below the preset luminance.

The area with an undesirable surface condition may include at least one of a contaminated area and a damaged area of the image forming medium.

The image forming apparatus may additionally include a storage unit which stores identification information of the area confirmed to have an undesirable surface condition.

The color registration unit may include a sensor unit which emits light onto the image forming medium according to an input control signal and detects an amount of light reflected from the image forming medium, and a feedback control unit which provides a preset initial control signal to the registration sensor, and carries out feedback control with respect to the control signal input to the registration sensor unit according to a difference between the detected luminance and a preset target luminance. If the luminance of the registration sensor has a stable value, the feedback control unit may control the medium driving unit so that the image forming medium is rotated one time, and carries out feedback control with respect to the control signal input to the registration sensor unit while selecting optimum luminance of the registration sensor.

The target luminance may be luminance at a time point when the light reflected from the image forming medium is saturated.

The feedback control may be at least one of PI and PID controls.

The image forming apparatus may additionally include a storage unit which stores the control signal calculated until the image forming medium is rotated one time and the luminance detected according to the calculated control signal.

The color registration unit may calculate an average value of the detected luminance and a maximum value of the detected luminance, using the stored luminance, and select the optimum luminance of the registration sensor using the calculated average and maximum values.

The image forming medium may include at least one of a photosensitive drum, an intermediate transfer belt, and a paper conveying belt.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION

Certain exemplary embodiments of the present invention will now be described in greater detail with reference to the accompanying drawings.

In the following description, the same drawing reference numerals are used for the same elements throughout the drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

Figure 1:
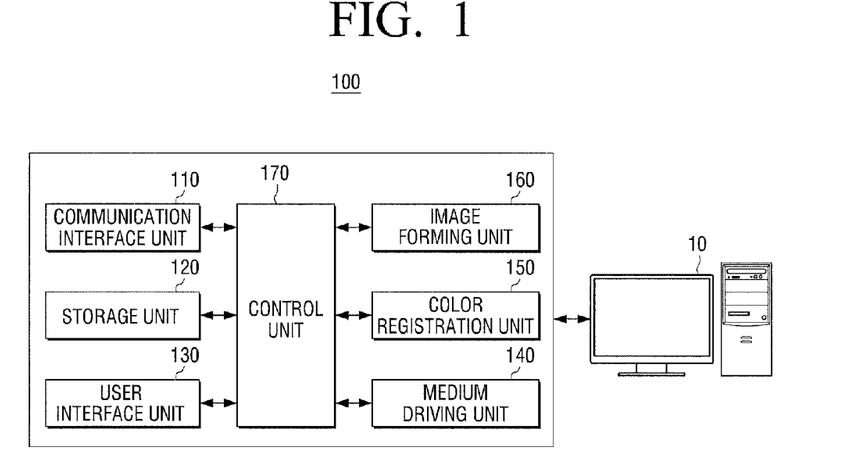
FIG. 1 is a block diagram of an image forming apparatus according to an embodiment.

FIG. 1 is a block diagram of an image forming apparatus according to an embodiment.

Referring to FIG. 1, the image forming apparatus 100 may include a communication interface unit 110, a storage unit 120, a user interface unit 130, a medium driving unit 140, a color registration unit 150, an image forming unit 160, and a control unit 170.

The communication interface unit 110 may be connected to a print control terminal 10 such as a personal computer (PC), a laptop computer, a personal digital assistant (PDA), or a digital camera, for example. To be specific, the communication interface unit 110 may be configured to connect the image forming apparatus 100 to an external device, and connected to the print control terminal 10 via Local Area Network (LAN) and the internet, or other ways, such as via Universal Serial Bus (USB) port, for example. Additionally, the communication interface unit 110 may be configured to be connected to the print control terminal 10 not only in a wired manner, but also in a wireless manner.

The communication interface unit 110 may receive print data from the print control terminal 10. The communication interface unit 110 may receive a command directing to carry out color registration from the print control terminal 10.

The storage unit 120 may store the print data. To be specific, the storage unit 120 may store the print data received via the communication interface unit 110. The storage unit 120 may also store history information of the jobs carried out at the image forming apparatus 100. The storage unit 120 may also store identification information of the areas with undesirable surface conditions which are confirmed through the color registration unit 150. Further, the storage unit 120 may store a control signal computed at the color registration unit 150, and luminance detected in response to the computed control signal.

The storage unit 120 may be implemented as an internal storage medium and an external storage medium of the image forming apparatus 100, such as a removable disk including a USB memory, or a Web server via a network, for example. In one embodiment, the storage unit 120 is located outside the color registration unit 150. However, the storage unit 120 may also be located inside the color registration unit 150.

The user interface unit 130 may include a plurality of function keys with which the user can set or select functions supported by the image forming apparatus 100. The user interface unit 130 may also display information provided by the image forming apparatus 100. The user interface unit 130 may be implemented as a device such as a touchpad which is capable of both inputting and outputting, or a device integrating therein a mouse and a monitor. The user may input a command to start the color registration to the image forming apparatus 100 using the user interface window provided through the user interface unit 130.

The medium driving unit 140 rotates the image forming medium. To be specific, the medium driving unit 140 may drive an image forming medium such as a photosensitive drum (OPC) on which an image is formed, an intermediate transfer belt (ITC), or a paper conveying belt, for example.

The color registration unit 150 sets an optimum luminance of the registration sensor in a feedback manner, if color registration is necessary. The color registration unit 150 may also check the areas with undesirable surface conditions of the image forming medium using the luminance detected from the rotating surface of the image forming medium during the setting of the optimum luminance of the registration sensor. The color registration unit 150 may also carry out color registration using the set optimum luminance. The detailed construction and operation of the color registration unit 150 will be explained in greater detail below with reference to FIG. 2.

The image forming unit 160 forms an image. To be specific, the image forming unit 160 may form an image on the image forming medium such as the photosensitive drum, the intermediate transfer belt, or the paper conveying belt on which the image is formed.

The image forming unit 160 may then form a preset mark on the image forming medium for color registration adjustment. To be specific, the image forming unit 160 may form the preset mark for color registration adjustment on the image forming medium except the areas which are confirmed to have undesirable surface conditions. The 'preset mark' herein may include a total reflection or irregular reflection pattern, or any other various patterns depending on the control method employed.

The control unit 170 controls the respective components of the image forming apparatus 100. To be specific, the control unit 170 may control the image forming unit 160 to start printing received print data, if the print data is received from the print control terminal 10.

The control unit 170 may also determine if it is necessary to carry out the color registration. To be specific, the control unit 170 may determine that it is necessary to carry out the color registration if a preset pages of paper have been printed based on the history information stored at the storage unit 120, or if a command is received directing the control unit to start the color registration from the print control terminal 10 or the user interface unit 130. In one embodiment, the above-explained operation may also be implemented to carry out density correction.

If color registration is necessary, the control unit 170 may control the color registration unit 150 to carry out the color registration.

Figure 2:
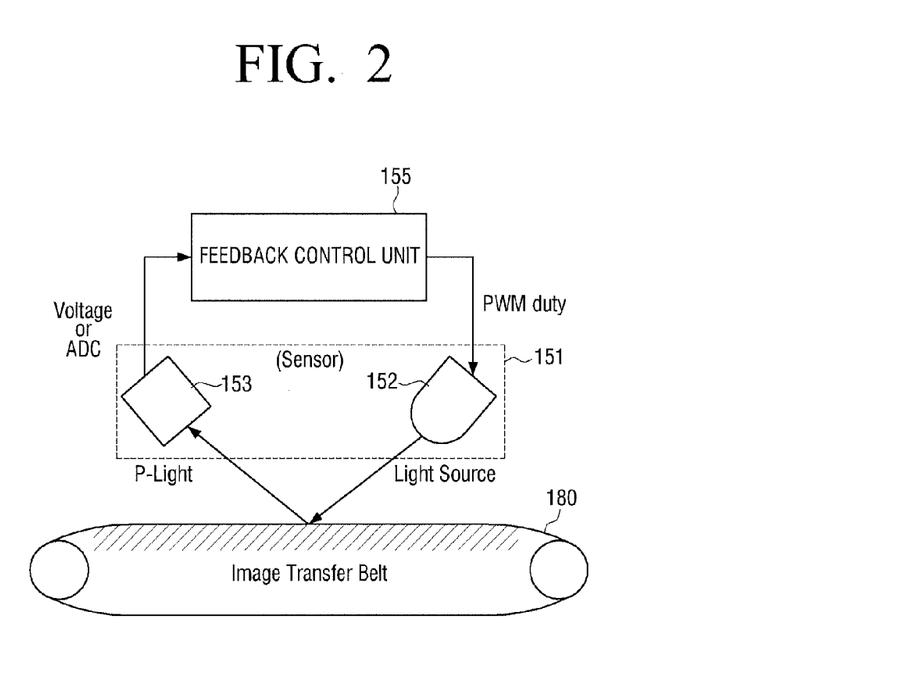
FIG. 2 is a view illustrating in detail the structure of the color registration unit of FIG. 1.

FIG. 2 is a view illustrating in detail the construction of the color registration unit of FIG. 1.

Referring to FIG. 2, the color registration unit 150 may include a registration sensor unit 151 and a feedback control unit 155.

The registration sensor unit 151 may include a light emitting unit 152 and a light receiving unit 153, in which the light emitting unit 152 emits light to the image forming medium 180 at a predetermined level according to a control signal provided from the feedback control unit 155, and the light receiving unit 153 detects the emitted light which is reflected from the image forming medium 180. The light emitting unit 152 may be implemented as a light emitting diode (LED). Additionally, the control signal input to the light emitting unit 152 may be a pulse width modulation (PWM) signal with a predetermined duty ratio to control the luminance of the LED input to the light emitting unit 152.

The feedback control unit 155 controls the luminance of the registration sensor in a feedback manner. To be specific, the feedback control unit 155 may provide the registration sensor unit 151 with a preset initial control signal, carry out feedback control with respect to the control signal input to the registration sensor unit 151 according to a difference between the luminance detected at the registration sensor unit 151 and a preset target luminance, and if the luminance of the registration sensor unit 151 is determined to be in steady state, select the luminance of the registration sensor unit 151 corresponding to the detected luminance as a reference luminance. The above feedback control may be implemented as a PI control or a PID control. The operation of the feedback control unit 151 operating in the PI control manner will be explained in greater detail below with reference to FIG. 3. The 'target luminance' herein refers to the luminance at a time point when the reflected light from the image forming medium 180 is saturated.

If the luminance of the registration sensor unit 151 is determined to be in steady state, the feedback control unit 155 may control the medium driving unit 140 to rotate the image forming medium 180. To be specific, the feedback control unit 155 may control the medium driving unit 140 so that the image forming medium 180 rotates at a time point when reference luminance control starts (i.e., at a time point when the luminance of the registration sensor unit 151 becomes steady).

At this time, the feedback control unit 155 may control the storage unit 120 to store the control signal computed during one additional rotation of the image forming medium 180 and the luminance detected in response to the control signal. If the image forming medium is determined to be free of noise or have only a relatively small amount of noise, the feedback control unit 155 may select the luminance of the registration sensor corresponding to the detected luminance as the optimum luminance.

Meanwhile, if the image forming medium has noise (i.e., if the image forming medium has a contaminated or damaged area), the feedback control unit 155 computes an average of the luminosities detected during one rotation of the image forming medium, and computes a maximum value of the stored luminosities, so that if the difference between the computed maximum and average luminosities is smaller than a preset value, the luminance of the registration sensor corresponding to the computed maximum may be selected as an optimum luminance. However, if the difference between the computed maximum and average luminosities is greater than the preset value, the feedback control unit 155 may select the luminance of the registration sensor corresponding to the computed average, which is added with a preset offset, as the optimum luminance. Depending on embodiments, the feedback control unit 155 may select the luminance of the registration sensor corresponding to the computed average as the optimum luminance, if a difference between the computed maximum and average luminosities is smaller than a preset value.

Accordingly, the optimum luminance may be set in consideration of the noise component (i.e., in consideration of an area of the medium where amount of reflection decreases) which is present on the image forming medium.

The feedback control unit 155 compares the luminance detected during one rotation of the image forming medium with the preset luminance. If the detected luminance is lower than the preset luminance, the feedback control unit 155 determines that the corresponding area on the image forming medium has an undesirable surface condition.

Herein, the feedback control unit 155 may control the storage unit 120 to store identification information of the area with an undesirable surface condition which is found during one rotation of the image forming medium. The storage unit 120 may store identification information of the area with an undesirable surface condition in the form of time information or location information. If the area with an undesirable surface condition is stored in the form of time information, the time information may include polling time at which the area with an undesirable surface condition starts and rising time at which the area with an undesirable surface condition ends.

With reference to FIGS. 1 and 2, the color registration unit 150 includes one registration sensor unit and one feedback control unit. However, in another embodiment, the color registration may be carried out at two or more areas, in which case the color registration unit 150 may include two (or more) registration sensor units and two (or more) feedback control units. In one embodiment, one feedback control unit may be implemented to feedback-control two (or more) registration sensor units at the same time.

Figure 3:
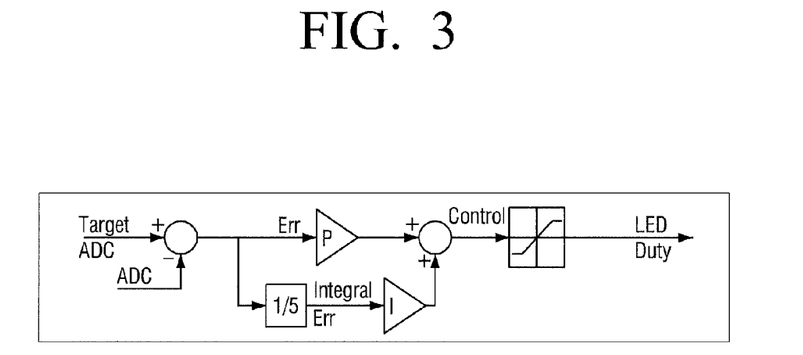
FIG. 3 is a view provided to explain the operation of the feedback control unit of FIG. 2 in detail.

FIG. 3 is a view provided to explain operation of the feedback control unit of FIG. 2 in greater detail.

Referring to FIG. 3, the feedback control unit 155 receives the target luminance and the luminance detected at the light receiving unit 153.

The feedback control unit 155 then compares the input target luminance and the luminance detected at the light receiving unit 153 and calculates the error.

The feedback control unit 155 then multiplies a proportional gain and an integral gain by the calculated error, and adds the result of multiplying the proportional gain and the integral gain by the error, to thereby generate a control signal with respect to the registration sensor. The control signal generated herein may be a PWM signal with a predetermined duty ratio to control the luminance of the light emitting unit.

The generated control signal is input to the registration sensor unit 151, so that the registration sensor unit 151 emits the light according to the input control signal. Accordingly, the light is reflected from the image forming medium and detected at the registration sensor unit 151, and the detected luminance is input to the feedback control unit 155. In this manner, the feedback control unit 155 carries out PI control with respect to the luminance of the registration sensor unit 151.

In explaining the embodiment with reference to FIG. 3, it is described that the feedback control unit 155 controls the luminance of the registration sensor unit 151 using PI control. However, depending on embodiments, it is also possible to implement PID control to control the luminance of the registration sensor unit 151.

Figure 4:
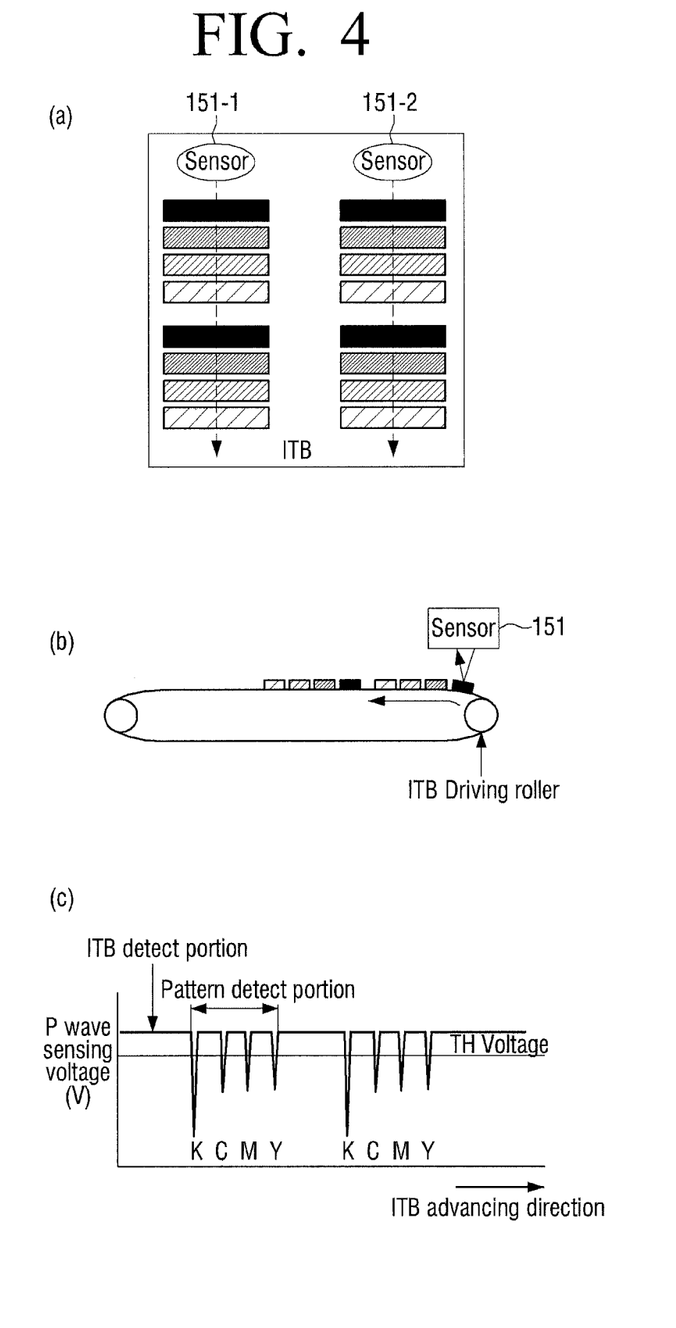
FIG. 4 is a view provided to explain the operation of color registration according to an embodiment.

FIG. 4 is a view provided to explain the color registration operation according to an embodiment.

First, the image forming unit 160 may form preset marks necessary for color registration, as illustrated in FIGS. 4A and 4B, on the image forming medium, excluding the area with an undesirable surface condition.

Next, the light emitting unit 151 of the registration sensor unit 151 emits light onto the image forming medium, and the reflected pattern thereof is detected at the light receiving unit 153 of the registration sensor unit 151. That is, the reflected pattern may be measured as a voltage level at the light receiving unit 153. FIG. 4C illustrates an example of the reflected pattern detected at the light receiving unit 153.

The color registration unit 150 compares the voltage level measured at the light receiving unit 153 with a preset voltage level, to thereby detect the location of the pattern. The color registration unit 150 may then carry out color registration according to the detected location of the pattern.

Figure 5:
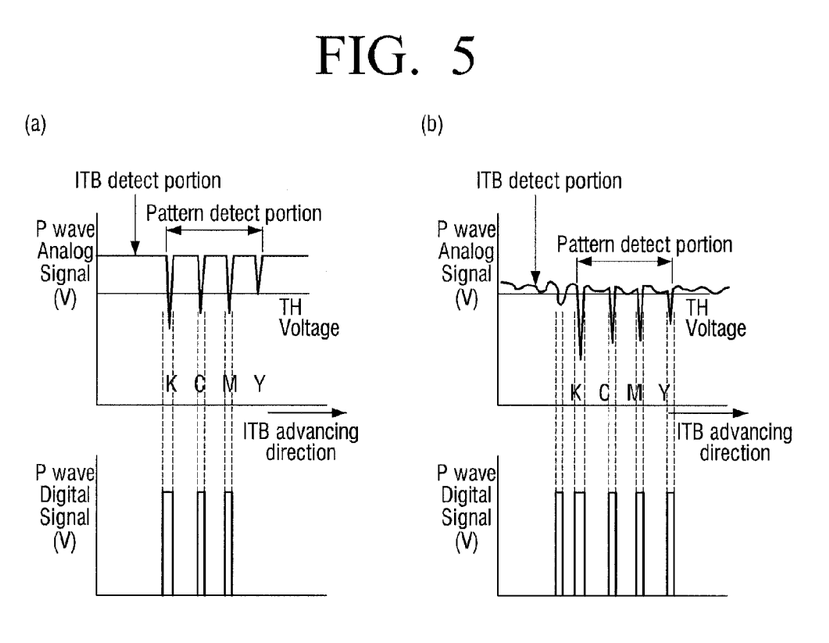
FIG. 5 is a view provided to explain the effect of color registration according to change in luminance of a registration sensor.

If the luminance of the light emitting unit 152 is set to be relatively higher in the color registration adjustment operation, the amount of reflection of each color formed on the image forming medium increases, in which case the pattern in lighter shade (e.g., yellow pattern) has increased amount of reflection. As a result, the pattern in lighter shade may not be perceived, as shown in the example illustrated in FIG. 5A, where the yellow pattern is left unperceived.

Conversely, if the luminance of the light emitting unit 152 is set to be relatively lower in the color registration adjustment operation, the amount of reflection on the surface of the image forming medium is not saturated sufficiently, in which case the surface of the image forming medium has uneven amount of reflection. Additionally, even only a relatively small noise component within the image forming medium is perceived as a voltage level, and as a result, an inaccurate pattern may be perceived, as shown in the example illustrated in FIG. 5B.

Accordingly, in order to carry out color registration adjustment accurately, it is desirable that the light emitting unit 152 emits light with appropriate luminance. A method for finding an optimum luminance of the light emitting unit 152 will be explained below.

Figure 6:
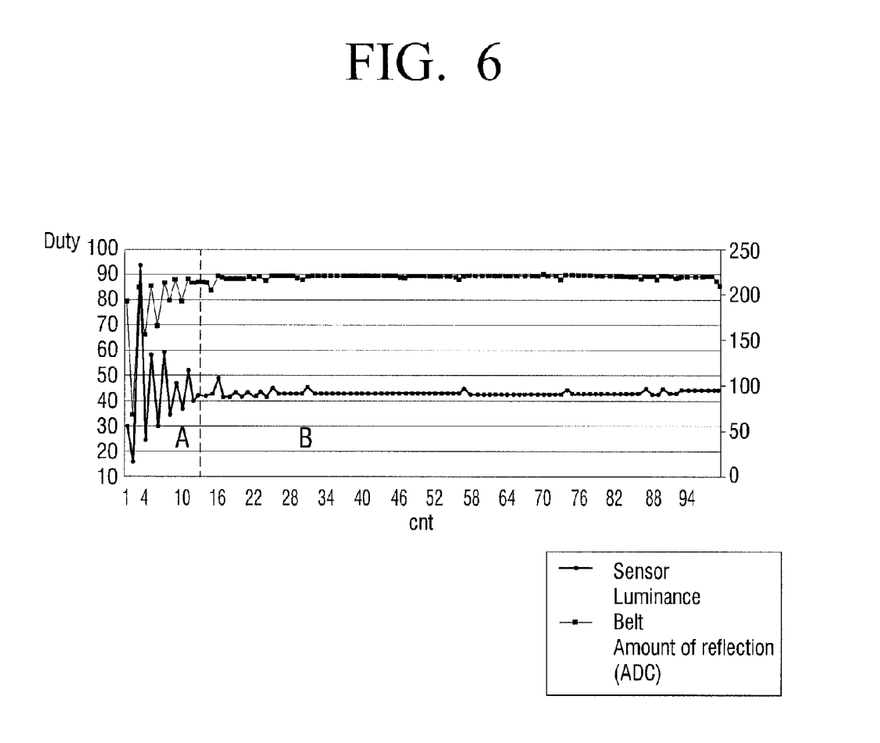
FIG. 6 is a view illustrating sizes of the luminance of a registration sensor and the detected luminance according to an embodiment.

FIG. 6 is a view illustrating measurements of the luminance at the registration sensor and the luminance as detected according to an embodiment.

As explained above, if the signal level representing the detection of the surface of the image forming medium is not saturated sufficiently, a noise-like signal on the surface of the image forming medium may be detected, while if the signal level is saturated too much, the pattern may not be perceived during the registration adjustment.

Accordingly, as indicated in region (A) of FIG. 6, the difference between the total reflection value at the image forming medium and the total reflection value according to the pattern reaches maximum right before the luminance of the light reflected from the image forming medium is saturated, and thus it is desirable that the luminance at the time point when the amount of light reflected from the image forming medium is saturated during color registration adjustment. Accordingly, the color registration unit 150 may find, by the feedback control, the time point at which the amount of light reflected from the image forming medium is saturated, and set an optimum luminance based on the luminance at the time point that includes the amount of light reflected from the image forming medium.

Meanwhile, in case the image forming medium includes a noise component, it is desirable to calculate the luminance at a time point when the amount of light reflected from the rotating region of the image forming medium is saturated.

To be specific, the optimum luminance may be calculated based on the feedback from one rotation of the image forming medium so that specific portions on the image forming medium (i.e., a noise component such as a scratch on a belt, or the attachment of toner, for example) do not influence the color registration adjustment.

Figure 7:
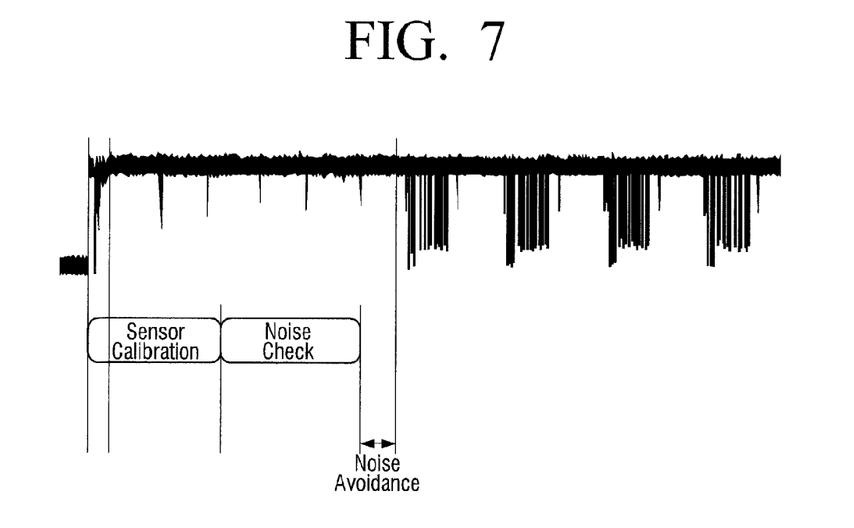
FIGS. 7 to 10 are views illustrating the result of a test which investigated the performance by a color registration method according to an embodiment.
Figure 8:
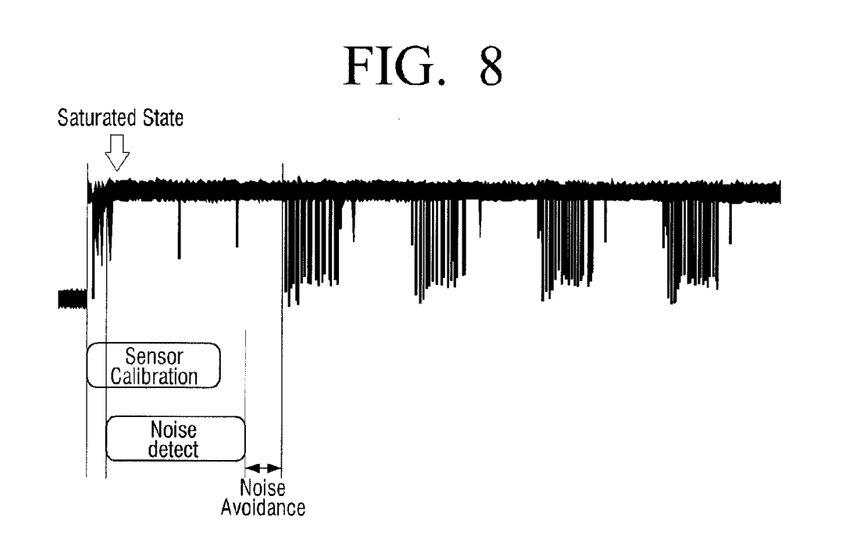
Figure 9:
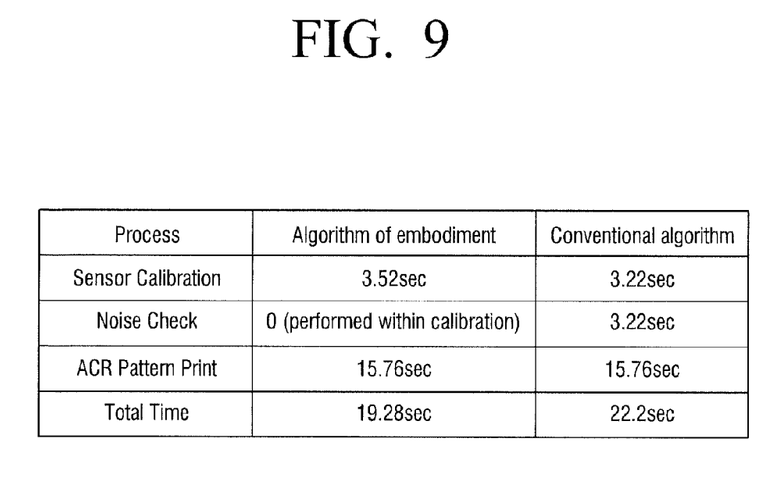

FIGS. 7 to 9 are views illustrating test results of investigating the performances of a color registration method according to an embodiment.

To be specific, FIG. 7 shows the amount of illumination detected at the conventional registration sensor, which individually finds the optimum luminance of the registration sensor and area with an undesirable surface condition. FIG. 8 is a view illustrating the amount of illumination detected at the registration sensor according to an embodiment. FIG. 9 is a tabulated form listing the test results of FIGS. 7 and 8.

Referring to FIGS. 7 to 9, according to an embodiment, the total time taken for the color registration is reduced since the area with an undesirable surface condition is checked during the process of finding optimum luminance of the registration sensor.

Referring to FIG. 8, the process for finding the optimum luminance and the process for detecting an area with an undesirable surface condition are overlapped and thus, the present invention may reduce the operation time of a color registration. In addition, the preset registration pattern is formed excluding the area with an undesirable surface condition (i.e., downwardly-protruding area) which is checked during the process of finding optimum luminance of the registration sensor.

Figure 10:
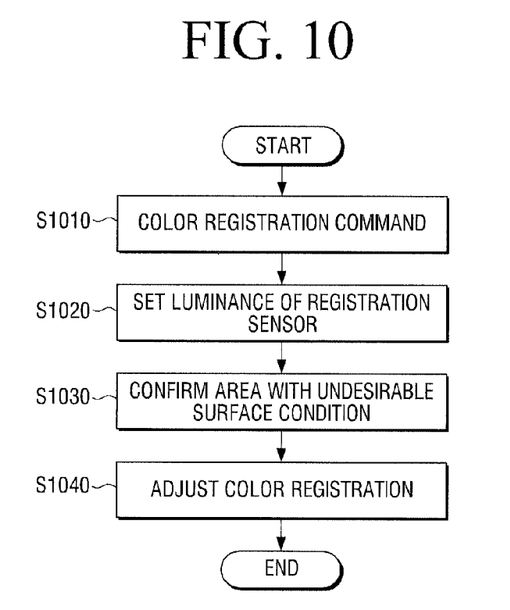

FIG. 10 is a view provided to explain a color registration method according to an embodiment.

Referring to FIG. 10, at S1010, it is determined if color registration is necessary. To be specific, color registration is necessary if a preset amount of paper has been printed or if a color registration command is input by a user. In one embodiment, the following operations are carried out if the color registration is necessary. However, in other embodiments, the same operations may also be carried out during a density correction processing.

If color registration is necessary, at S1020, the optimum luminance of the registration sensor with respect to the rotating surface of the image forming medium is set while rotating the image forming medium. The operation to set optimum luminance will be explained in greater detail below with reference to FIG. 11.

At S1030, the area with an undesirable surface condition of the image forming medium is confirmed. To be specific, the luminance detected with respect to the rotating surface of the image forming medium is compared with a preset luminance, and the area with an undesirable surface condition is confirmed if a luminance below the preset luminance is detected.

If the optimum luminance is set, at S1040, the color registration adjustment is carried out. To be specific, preset marks for color registration adjustment are formed on the image forming medium except the area confirmed with an undesirable surface condition, and color registration adjustment is carried out using the optimum luminance as set for the formed marks.

Figure 11:
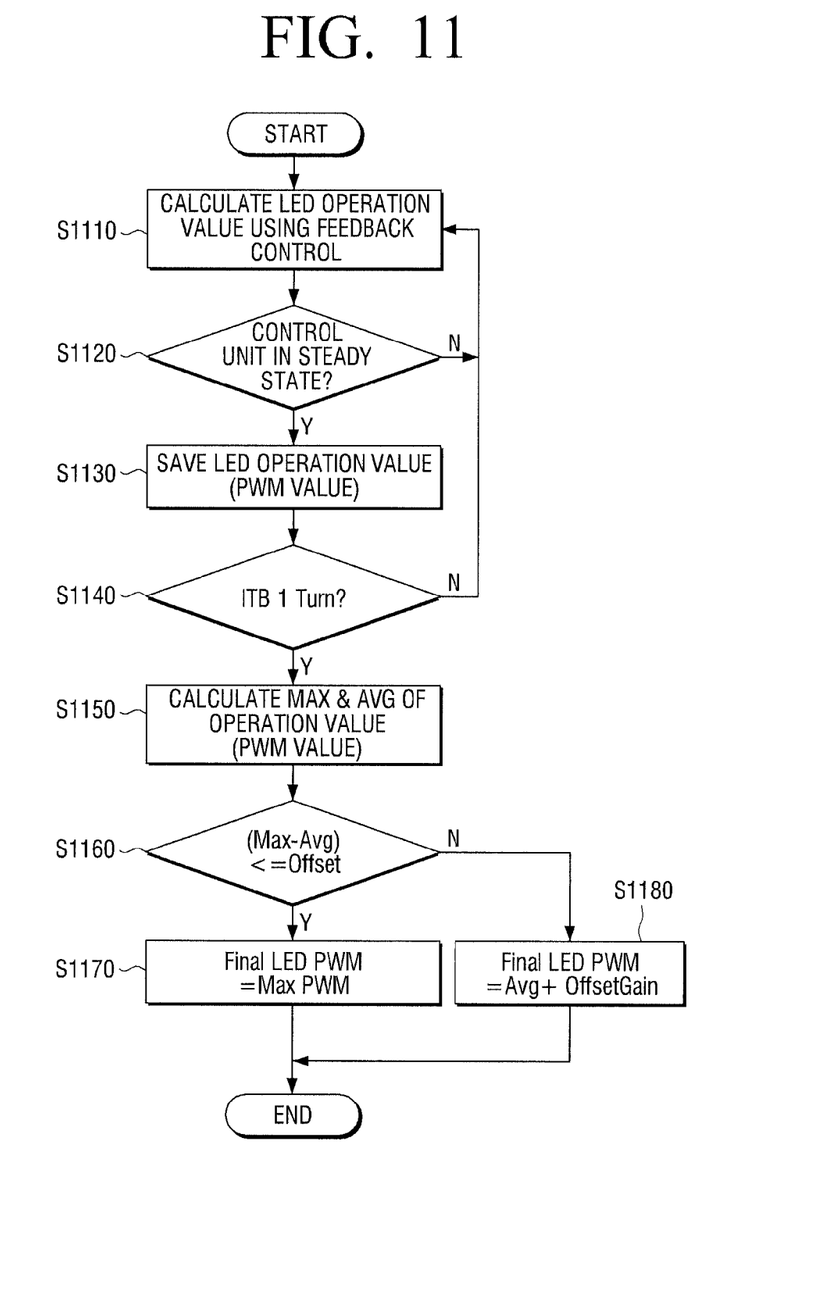
FIG. 11 is a view provided to explain a color registration method according to an embodiment.

FIG. 11 is a view provided to explain the method for setting optimum luminance of FIG. 10 in detail.

Referring to FIG. 11, first, the image forming medium is rotated. Next, a preset initial control signal is provided to the registration sensor and the luminance reflected from the image forming medium according to the provided initial control signal is detected. At S1110, depending on a difference between the detected luminance and the preset target luminance, a control signal to be input to the registration sensor is calculated. The 'target luminance' herein refers to the luminance at a time point when the light reflected from the image forming medium is saturated.

At S1120, by comparing the detected luminance with the preset target luminance, it is determined if the luminance of the registration sensor has a stable value.

At S1120-N, if the luminance of the registration sensor does not have a stable value, at S1130, the calculated control signal is provided to the registration sensor and the above-explained operations repeat. That is, the feedback control as those illustrated in FIG. 3 are carried out.

Meanwhile, at S1120-Y, if the luminance of the registration sensor has a stable value, at S1130, the calculated control signal and the luminance detected according to the calculated control signal are stored.

At S1140, it is determined if the image forming medium is rotated one time after the luminance of the registration sensor is stabilized. At S1140-N, if it is determined that the image forming medium has not rotated one time, the above-explained operations repeat until the image forming medium has rotated one time.

Meanwhile, at S1140-Y, if the image forming medium rotates one time after the luminance of the registration sensor is stabilized, at S1150, the average luminance and the maximum luminance of the stored luminance are calculated.

At S1160, the calculated maximum and average luminance are compared with each other.

At S1170, if the comparison indicates that a difference between the calculated maximum luminance and the calculated average luminance is lower than a preset value, a reference luminance is set based on the luminance of the registration sensor corresponding to the calculated maximum luminance. Depending on embodiments, the reference luminance may be set based on the luminance of the registration sensor corresponding to the calculated average luminance.

At S1180, if the difference between the calculated average and maximum luminance is greater than the preset value, the reference luminance is set based on the luminance of the registration sensor corresponding to the calculated average luminance added with a preset offset value.

Accordingly, color registration can be carried out quickly according to an embodiment, since the area with an undesirable surface condition of the image forming medium is also checked using the luminance measured during the process of finding the optimum luminance of the registration sensor. The embodiments illustrated in FIGS. 10 and 11 may be implemented on the image forming apparatus 100 constructed as illustrated in FIG. 1, or on any other image forming apparatuses with different constructions.

The foregoing exemplary embodiments and advantages are merely exemplary and are not to be construed as limiting the present inventive concept. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for color registration of an image forming apparatus having a registration sensor, the method comprising:
   determining if color registration is necessary;
   if color registration is necessary, rotating an image forming medium and setting an optimum luminance of the registration sensor with respect to a rotating surface of the image forming medium;
   confirming an area with an undesirable surface condition on the image forming medium using luminance detected with respect to the rotating surface of the image forming medium;
   forming a preset mark for color registration adjustment excluding the area confirmed to have an undesirable surface condition; and
   carrying out color registration adjustment using the optimum luminance set with respect to the formed mark,
   wherein a time for setting an optimum luminance of the registration sensor is overlapped with a time for detecting an area with an undesirable surface condition.

2. The method of claim 1, wherein confirming the area with an undesirable surface condition comprises comparing luminance detected with respect to the rotating surface of the image forming medium with a preset luminance, and confirming an area of the image forming medium to have an undesirable surface condition if the detected luminance of the area has luminance below the preset luminance.

3. The method of claim 1, wherein the area with an undesirable surface condition comprises at least one of a contaminated area and a damaged area of the image forming medium.

4. The method of claim 1, further comprising storing identification information of the area confirmed to have an undesirable surface condition.

5. The method of claim 1, wherein setting the optimum luminance comprises:
   providing a preset initial control signal to the registration sensor;
   detecting luminance reflected from the image forming medium according to the control signal provided to the registration sensor;
   calculating a control signal according to a difference between the detected luminance and a preset target luminance;
   comparing the detected luminance with the target luminance and determining if the luminance of the registration sensor has a stable value;
   providing the calculated control signal to the registration sensor if the luminance of the registration sensor does not have a stable value, and repeating the detecting, the calculating and the determining; and
   if the luminance of the registration sensor has a stable value, repeating rotating of the image forming medium and also the detecting and the calculating until the image forming medium is rotated one time, to thereby select optimum luminance of the registration sensor.

6. The method of claim 5, wherein the target luminance is luminance at a time point when the light reflected from the image forming medium is saturated.

7. The method of claim 5, wherein calculating the control signal comprises calculating the control signal according to the luminance detected using at least one of proportional-integral and proportional-integral-derivative controls, and a control signal according to the target luminance.

8. The method of claim 5, wherein setting the optimum luminance further comprises storing the calculated control signal and the luminance detected according to the calculated control signal.

9. The method of claim 8, wherein setting the optimum luminance further comprises calculating an average value of the detected luminance and a maximum value of the detected luminance, using the stored luminance, and wherein selecting the optimum luminance comprises selecting the optimum luminance of the registration sensor using the calculated average and maximum values.

10. The method of claim 1, wherein the image forming medium comprises at least one of a photosensitive drum, an intermediate transfer belt, and a paper conveying belt.

11. An image forming apparatus, comprising:
    a control unit which determines if color registration is necessary;
    a medium driving unit which rotates an image forming medium;
    a color registration unit which controls the medium driving unit to rotate the image forming medium if color registration is necessary, sets an optimum luminance of a registration sensor with respect to a rotating surface of the image forming medium, and confirms an area with an undesirable surface condition on the image forming medium using luminance detected with respect to the rotating surface of the image forming medium; and
    an image forming unit which forms a preset mark for color registration adjustment excluding the area confirmed to have an undesirable surface condition, wherein the color registration unit carries out color registration adjustment using the optimum luminance set with respect to the formed mark, wherein a time for setting an optimum luminance of the registration sensor is overlapped with a time for detecting an area with an undesirable surface condition.

12. The image forming apparatus of claim 11, wherein the color registration unit compares luminance detected with respect to the rotating surface of the image forming medium with a preset luminance, and confirms an area of the image forming medium to have an undesirable surface condition if the detected luminance of the area has luminance below the preset luminance.

13. The image forming apparatus of claim 11, wherein the area with an undesirable surface condition comprises at least one of a contaminated area and a damaged area of the image forming medium.

14. The image forming apparatus of claim 11, further comprising a storage unit which stores identification information of the area confirmed to have an undesirable surface condition.

15. The image forming apparatus of claim 11, wherein the color registration unit comprises:
- a sensor unit which emits light onto the image forming medium according to an input control signal and detects an amount of light reflected from the image forming medium; and
- a feedback control unit which provides a preset initial control signal to the registration sensor, and carries out feedback control with respect to the control signal input to the registration sensor unit according to a difference between the detected luminance and a preset target luminance, wherein if the luminance of the registration sensor has a stable value, the feedback control unit controls the medium driving unit so that the image forming medium is rotated one time, and carries out feedback control with respect to the control signal input to the registration sensor unit while selecting optimum luminance of the registration sensor.

16. The image forming apparatus of claim 15, wherein the target luminance is luminance at a time point when the light reflected from the image forming medium is saturated.

17. The image forming apparatus of claim 15, wherein the feedback control is at least one of proportional-integral and proportional-integral-derivative controls.

18. The image forming apparatus of claim 15, further comprising a storage unit which stores the control signal calculated until the image forming medium is rotated one time and the luminance detected according to the calculated control signal.

19. The image forming apparatus of claim 18, wherein the color registration unit calculates an average value of the detected luminance and a maximum value of the detected luminance, using the stored luminance, and selects the optimum luminance of the registration sensor using the calculated average and maximum values.

20. The image forming apparatus of claim 11, wherein the image forming medium comprises at least one of a photosensitive drum, an intermediate transfer belt, and a paper conveying belt.

* * * * *